(12) United States Patent
Murayama

(10) Patent No.: US 8,942,401 B2
(45) Date of Patent: Jan. 27, 2015

(54) ELECTRO-ACOUSTIC CONVERTERS, ELECTRONIC DEVICES, WATERPROOF COVERS, AND AIR LEAKAGE TEST METHODS FOR ELECTRO-ACOUSTIC CONVERTERS

(75) Inventor: Shigeharu Murayama, Tokyo (JP)

(73) Assignee: W. L. Gore & Associates, Co., Ltd., Tokyo (JP)

( * ) Notice: Subject to any disclaimer, the term of this patent is extended or adjusted under 35 U.S.C. 154(b) by 1387 days.

(21) Appl. No.: 12/671,988

(22) PCT Filed: Jul. 31, 2008

(86) PCT No.: PCT/JP2008/063782
§ 371 (c)(1),
(2), (4) Date: Jul. 13, 2011

(87) PCT Pub. No.: WO2009/020046
PCT Pub. Date: Feb. 12, 2009

(65) Prior Publication Data
US 2011/0261986 A1     Oct. 27, 2011

(30) Foreign Application Priority Data
Aug. 7, 2007  (JP) .................................. 2007-205815

(51) Int. Cl.
*H04R 1/02* (2006.01)
*G01M 3/26* (2006.01)
*H04M 1/03* (2006.01)
*H04M 1/18* (2006.01)
*H04R 31/00* (2006.01)

(52) U.S. Cl.
CPC ........ *G01M 3/26* (2013.01); *H04M 1/03* (2013.01); *H04M 1/18* (2013.01); *H04R 31/00* (2013.01)
USPC ............................................ 381/332; 73/592

(58) Field of Classification Search
CPC ............ H04M 1/03; H04M 1/18; H04R 31/00
USPC ......... 381/174, 189, 150, 332, 334, 355–369; 73/592; 220/9.1; 29/592.1
See application file for complete search history.

(56) References Cited

U.S. PATENT DOCUMENTS 7,991,173 B2 *  8/2011  Ueki ............................ 381/174
8,150,082 B2 *  4/2012  Saito et al. .................... 381/322

FOREIGN PATENT DOCUMENTS

| EP | 1 775 015 A1 | 4/2007 | |
|---|---|---|---|
| JP | 8-79865 | 3/1996 | |
| JP | 2003250188 | 9/2003 | |
| JP | 2007-510326 | 4/2007 | |
| WO | 2006/090545 | 8/2006 | |
| WO | WO 2007/085307 | * 8/2007 | ............... H04R 1/10 |

* cited by examiner

Primary Examiner — Lun-See Lao
(74) Attorney, Agent, or Firm — Amy L. Miller

(57) ABSTRACT

It is an object to provide an electro-acoustic converter which can be subjected to air leakage test allowing a gas to pass through a waterproof film in such a condition that the waterproof film is attached to the electro-acoustic converter. An electro-acoustic converter is produced, which includes: a casing having a sound hole; and a diaphragm provided in the casing, wherein the sound hole is covered with the waterproof film to form a closed space, and the closed space is in communication with the outside of the casing through a vent for air leakage test.

10 Claims, 10 Drawing Sheets

ELECTRO-ACOUSTIC CONVERTERS, ELECTRONIC DEVICES, WATERPROOF COVERS, AND AIR LEAKAGE TEST METHODS FOR ELECTRO-ACOUSTIC CONVERTERS

TECHNICAL FIELD

This invention relates to electronic devices which are required to have high waterproof property, such as mobile phones and digital cameras, electro-acoustic converters used in the electronic devices, and waterproof covers used in the electro-acoustic converters. In particular, this invention relates to air leakage test structures and air leakage test methods for electro-acoustic converters such as microphones and speakers.

BACKGROUND TECHNOLOGY

Patent Document 1 (Japanese Unexamined Patent Publication (Kokai) No. Hei 8-79865) describes a structure in which: a diaphragm is provided in a receiver casing; a receiver is attached to the back side of a front casing in such a condition that the opening of the receiver casing faces with two or more sound holes formed on the front casing; and in order to prevent water drops from entering into the inside of the receiver through the holes, a waterproof film having excellent sound transmission performance is provided between the front casing and the receiver (see, e.g., FIG. 1).

Patent Document 2 (Japanese Unexamined Patent Publication (Kokai) No. 2006-262262) describes a structure in which: the front side of a rear casing is covered with a front casing; a circuit board is put in a concave portion of the rear casing; the front side of the circuit board is covered with a waterproof-type key sheet material; the outer edge of the waterproof-type key sheet material is sandwiched between the outer edge of the rear casing and the outer edge of the front casing; an mounting hole is formed in the waterproof-type key sheet material; and a microphone holder is inserted into the mounting hole. In addition, a microphone is mounted in the microphone holder; a waterproof film is attached to the end face of the microphone holder; and a small opening of the microphone holder is closed with the waterproof film (see, e.g., FIGS. 2 to 4).

DISCLOSURE OF THE INVENTION

Problems to be Solved by the Invention

In the future, when an electronic device having an electro-acoustic converting part such as a speaker or a microphone is required to have waterproof property, for example, in water at a depth of about one meter, the electronic device has to be tested on whether its waterproof film has no damages such as microscopic breaks, i.e., whether prescribed waterproof performance is exhibited. In this test, it is effective to carry out air leakage test (gas leakage test) in which a gas is allowed to pass though the waterproof film.

However, as shown in FIG. 1 of Patent Document 1, in such a condition that a waterproof film is attached to a receiver casing, a gas cannot be allowed to flow into the closed space (i.e., the inside of the casing), and it is not possible to carry out air leakage test.

On the other hand, as shown in FIG. 2 of Patent Document 2, in the case of a method in which a part supporting a waterproof film, such as a microphone holder, a front casing, a rear casing, a circuit board, a microphone, and other parts are attached, respectively, in the step of final assembling, it is possible to carryout air leakage test in such a condition that the waterproof film is attached to the front casing. It is because the waterproof property of the waterproof film itself cannot be evaluated after the waterproof film is attached to the microphone holder that the waterproof film is attached to the front casing.

However, when the waterproof film is attached to the front casing, it is necessary to achieve such an attaching by hand working, in general, at which time wrinkles can be generated in the waterproof film. This is because the waterproof film is thin but has no elasticity. If wrinkles are generated in the waterproof film, chatter sounds may easily be generated. In addition, these wrinkles may cause the breaking of the waterproof film or the generation of a gap at the bonding area between the front casing and the waterproof film, resulting in a cause of water leakage.

Furthermore, the method disclosed in Patent Document 2 has a problem that the number of parts or the number of processes may be increased in the step of final assembling. In addition, the distance between the diaphragm and the waterproof film in the electro-acoustic converting part may easily vary, resulting in a problem that electronic devices as final products may have different acoustic characteristics.

Means for Solving the Problems

The electro-acoustic converter of this invention, which has attained the above object, comprises: a casing having at least one sound hole; and a diaphragm provided in the casing, wherein the sound hole is covered with a waterproof film to form a closed space, and the closed space is in communication with the outside of the casing through a vent for air leakage test.

In addition, the above object is also attained by an electro-acoustic converter comprising a casing; a diaphragm provided in the casing; at least one sound hole and a vent for air leakage test, both of which are formed on the casing; and a waterproof film which covers the sound hole.

The electro-acoustic converter of this invention has a vent for air leakage test, through which a gas can be allowed to flow into the outside or inside of the casing, and therefore, the air leakage test of the waterproof film can be carried out in such a condition that the waterproof film is attached to the casing.

In the above electro-acoustic converter, the waterproof film may preferably be attached to a frame having a sound opening. This is because the property of handing a thin waterproof film can be improved.

In the above electro-acoustic converter, the frame further may preferably have an opening for air ventilation, and the opening for air ventilation of the frame may preferably be in communication with the vent for air leakage test.

In the above electro-acoustic converter, the waterproof film may preferably have an opening for air ventilation, and this opening for air ventilation may preferably be in communication with the opening for air ventilation of the frame.

In the above electro-acoustic converter, Gurley air resistance (JIS P 8117:1998) of the waterproof film may preferably be one second or higher.

In the above electro-acoustic converter, the waterproof film may preferably be a porous polytetrafluoroethylene film.

As the above electro-acoustic converter, there can be mentioned, for example, a sound wave receiver or a sound wave generator.

In the above electro-acoustic converter, when one or more casings each has at least one sound hole for releasing a call sound and at least one sound hole for releasing an alarm sound, both the sound holes may preferably be covered with a same waterproof film. This is because the process for producing electro-acoustic converters can be simplified.

In the above electro-acoustic converter, the vent for air leakage test may preferably be provided with a sealer. This is because the electro-acoustic converter can have improved acoustic characteristics.

In the above electro-acoustic converter, an elastic material may preferably be formed on part of all of a periphery of the casing.

In the above electro-acoustic converter, the vent for air leakage test may preferably be sealed with the elastic material.

It may be preferred to form an electronic device comprising: an electro-acoustic converter as described above; and an outer casing having a concave portion to be fitted with the electro-acoustic converter.

As an electronic device comprising an electro-acoustic converter as described above and an outer casing, it may be a preferred embodiment wherein the electro-acoustic converter is brought into contact with part of the outer casing, so that the vent for air leakage test is sealed.

The waterproof cover of this invention, which has attained the above object, comprises: a frame; and a waterproof film which covers a sound opening on the frame, wherein a vent for air leakage test is formed on the frame.

The term "casing" as used in this invention means a receiving case which ensures a space for enclosing a diaphragm of the electro-acoustic converter. Its shape and the position and size of an opening are not particularly limited.

The term "waterproof film" as used in this invention is a film for preventing the entering of water or dusts from the outside of the casing. Thus, the waterproof film does not necessarily have gas permeability.

In addition, it may be preferred to measure gas leakage from an electro-acoustic converter as described above by the steps of: allowing the electro-acoustic converter to adhere to a supplying sheet having an opening so that the opening overlaps with at least one sound hole of the electro-acoustic converter; and then allowing a gas to flow into the electro-acoustic converter from the opening or the vent for air leakage test.

In addition, when an electronic device is produced, the process may preferably comprise the steps of: removing an electro-acoustic converter as described above from a supplying sheet to which the electro-acoustic converter has been allowed to adhere; and then attaching the lector-acoustic converter in an outer casing.

Effects of the Invention

According to the electro-acoustic converter of this invention, because the electro-acoustic converter has a vent for air leakage test, through which the inside of the electro-acoustic converter is in communicated with the outside of the casing, air leakage test allowing a gas to pass through a waterproof film can be carried out in such a condition that the waterproof film is attached to the electro-acoustic converter. For this reason, the number of parts is decreased at the time of assembling electronic devices, resulting in an increase of production efficiency. In addition, according to the electro-acoustic converter of this invention, because the waterproof film is attached to the electro-acoustic converter, the distance between the diaphragm and the waterproof film in the casing can easily be kept constant and the electro-acoustic converter can have stabilized acoustic characteristics, in comparison with the case where the waterproof film is attached to the outer casing of an electronic device.

DESCRIPTION OF NUMERALS

Figure 1:
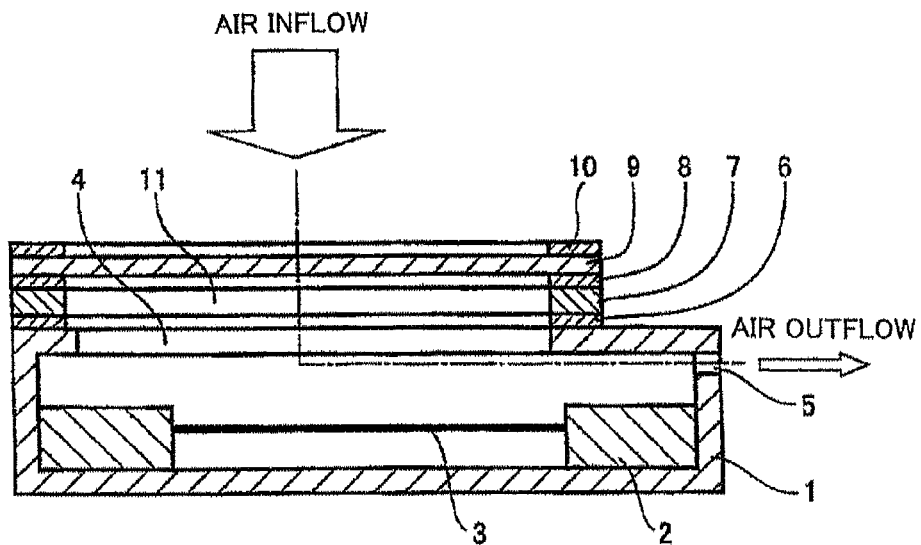
FIG. 1 is a schematic cross-sectional view of an electro-acoustic converter according to a mode for carrying out this invention.

1 Casing
2 Supporting member
3 Diaphragm
4 Sound hole
5 Vent for air leakage test
6, 8, 10 Double face tapes
7 Frame
9 Waterproof film
11 Sound opening
12, 13 Opening for air ventilation
14 Outer casing
15 Attached portion
16 Rubber cover
17 O-ring
18 Supplying sheet (separating liner)
19 Sealer 20 Gasket
21 Cylinder

BEST MODE FOR CARRYING OUT THE INVENTION

The following will describe in detail, with reference to the drawings, the electro-acoustic converters, electronic devices, waterproof covers, and air leakage test methods for electro-acoustic converters according to the modes for carrying out this invention.

Formation of Electro-Acoustic Converters

FIG. 1 shows a cross-section of a speaker (i.e., a sound wave generator which generates an alarm sound such as ring alert) for mobile phones, which is an example of the electro-acoustic converter. In FIG. 1, diaphragm 3 supported by supporting members 2 is provided in casing 1 of the speaker. On the upper face of the casing 1, there are formed sound hole 4 for releasing a sound generated from the diaphragm 3 and vent for air leakage test for allowing a gas in the casing 1 to flow toward the outside thereof at the time of air leakage test as described below.

The shape of the sound hole 4 is not particularly limited, but in the mode for carrying out this invention, the sound hole 4 has a circular shape, of which diameter is 16 mm. The shape of the vent 5 for air leakage test is also not particularly limited, but in the mode for carrying out this invention, the vent 5 for air leakage test also has a circular shape, of which diameter is 1 mm.

On the casing 1, there is formed a waterproof cover composed of a frame 7 and a waterproof film 9 supported by the frame 7, so that the entering of water or dusts into the inside of the casing 1 can be prevented. For the frame 7, PORON® ("SR-S-48P" available from Rogers Inoac Corporation) is used.

The sound opening 11 formed on the frame 7 is in communication with the sound hole 4 in the casing 1. The sound opening 11 is for releasing a sound, which has been generated from the diaphragm 3, to the outside of the speaker.

As the waterproof film 9, any one can appropriately be used as long as it has waterproof property and small rate of intensity attenuation for sound waves. The porous polytetrafluoroethylene (ePTFE sheet; "GAW315" available from Japan Gore-Tex Inc.) used in the mode for carrying out this invention has excellent waterproof property, porous structure, small mass, and excellent gas permeability, and therefore, has small rate of intensity attenuation for sound waves passing through the waterproof film 9 and is suitable for use in the electro-acoustic converter. The rate of intensity attenuation for sound waves highly depends on the mass per unit area of the waterproof film 9, and therefore, the waterproof film 9 does not necessarily have gas permeability. If the waterproof film has too high gas permeability, it becomes difficult to carry out damage check for the waterproof film by air leakage test. For this reason, the waterproof may preferably have Gurley air resistance of one second or higher, more preferably 3 seconds or higher. When the waterproof film has higher Gurley air resistance, finer defects can be detected thereon. The Gurley air resistance is expressed by measured values according to JIS P 8117 (1998).

The frame 7 and the waterproof film 9 are fixed to each other with double face tapes 6, 8, and 10 (double face adhesive tape "ST-416P" available from Sumitomo 3M Limited).

The waterproof film 9 and the frame 7 are prepared in such a condition that release papers (supplying sheet 18 as described below) are attached to both sides of double face tapes 6 and 10, and the casing 1 can be connected thereto in such a condition that a release paper on the side for attaching to the casing 1 is removed, i.e., another release paper remains on the other side, thereby causing no generation of wrinkles. In addition, the waterproof film 9 and the casing 1 in such a condition that they are connected with each other can be attached to an electronic device to be finally attached, thereby causing no generation of wrinkles.

Usually, in order to prevent foreign matters such as dusts from entering into the casing 1, a protective mesh is provided to cover the sound hole 4 of the casing 1. With the requirement of making electronic devices, such as mobile phones, and acoustic converters into a thin shape, there may also be a case where acoustic converters having no protective mesh are produced. However, in such a case, until an acoustic converter is finally attached to an electronic device, there is concern that foreign matters may enter into a portion around the diaphragm 3 in the casing 1 of the acoustic converter. In this connection, in the electro-acoustic converter according to the mode for carrying out this invention, the waterproof film 9 has preliminarily been attached to the casing 1, and therefore, the entering of foreign matters into the casing 1 can be prevented until the final step. Thus, the protective mesh may be omitted, which is effective for making electronic devices into a thin shape.

Air Leakage Test

The following will describe air leakage test which is carried out for examining the waterproof property of the speaker formed as described above.

Figure 14:
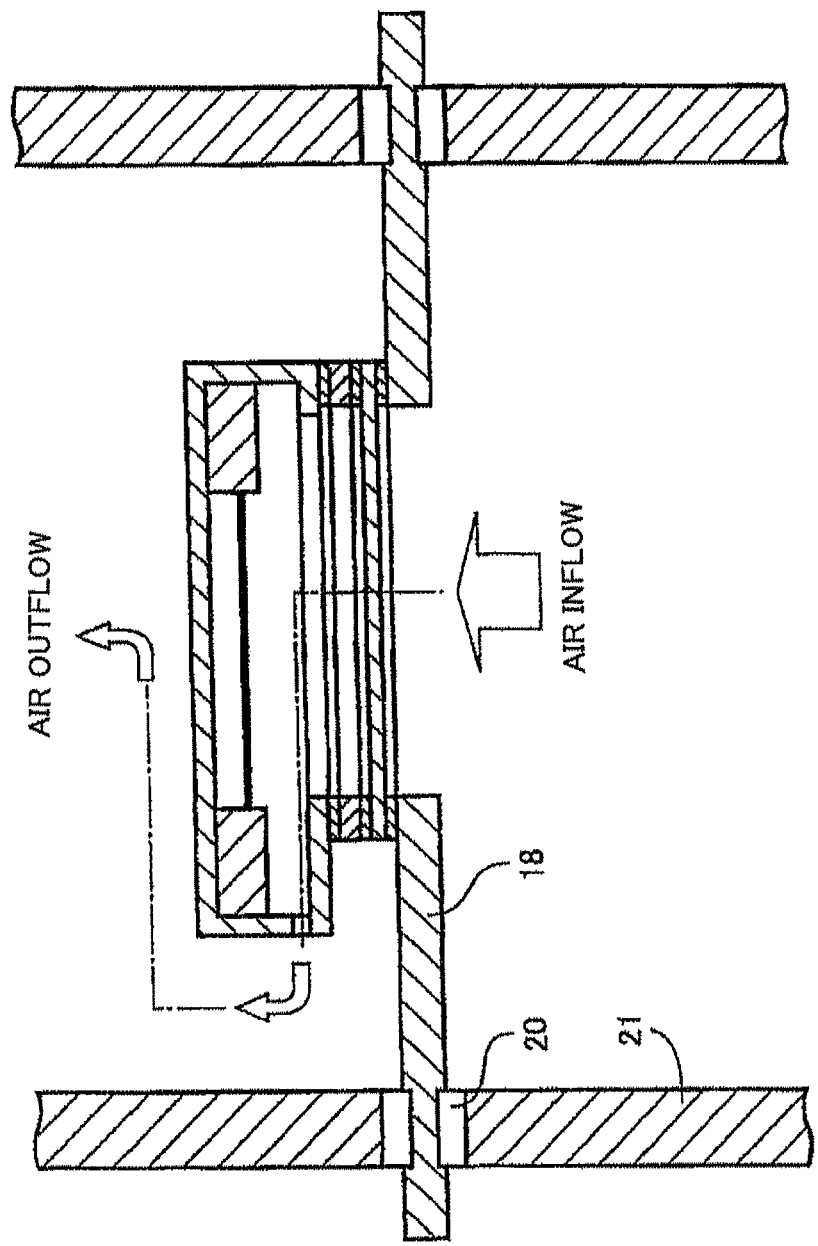
FIG. 14 is an enlarged view of a portion at which a test piece is placed in a Gurley tester.

The air leakage test is carried out by measuring the difficulty of air passing when the air is allowed to flow from the outside of the casing 1 through the waterproof film 9 into the inside of the casing 1. The degree of difficulty in the passing of air can be expressed on the basis of, for example, Gurley air resistance (JIS P 8117:1998). Usually, the Gurley air resistance is determined by measuring the time taken to complete the passing of a given volume of air though a test piece having a given area when the air is allowed to flow into the test piece under a prescribed pressure. In this invention, as shown in FIG. 14, the speaker having a waterproof cover attached thereto is put on a separating liner (referred to sometime as a "supplying sheet") being made of a PET film as a base material and having an opening at the center thereof, and the speaker is placed, together with the separating liner 18, at the sample placing portion (cylinder 21) of a tester. The time taken to complete the passing of a given volume of air through the electro-acoustic converter is defined as the Gurley air resistance of the electro-acoustic converter. The conditions of measurement shall be determined according to JIS P 8117 (1998). When the Gurley air resistance is smaller than a prescribed value, it means larger gas leakage, making a judgment, that the waterproof film 9 has defects such as breaks. Incidentally, the air leakage test can also be carried out by allowing a gas to flow from the vent 5 for air leakage test into the inside of the casing 1.

The Gurley air resistance as defined in JIS is normally directed to papers or paper boards as the material to be tested. In the present specification, the Gurley air resistance is defined without depending on the shape of the material to be tested and, for example, as shown in FIG. 14, the air resistance measured for the speaker (electro-acoustic converter) having the waterproof film 9 attached thereto is regarded as "the Gurley air resistance of the electro-acoustic converter."

It is sufficient if the vent 5 for air leakage test has an opening area wide enough to allow a release of the air flown into the casing 1 of the speaker and to lower the pressure in the casing 1 down to a level near atmospheric pressure at the time of air leakage test. When the waterproof film 9 itself has high air resistance, the vent 5 for air leakage test may have a small opening area.

When the Gurley air resistance of the waterproof cover is expressed by Tm and the Gurley air resistance of the speaker casing (having no waterproof cover attached thereto) is expressed by Td, it is preferred to be Tm≥Td. If Td becomes larger than Tm (i.e., the air permeability of the speaker casing becomes lower than the air permeability of the waterproof cover), it may sometimes become difficult to measure the air resistance of the waterproof cover because of an influence of pressure loss in the speaker casing.

The Gurley air resistance Tm of the waterproof cover and the Gurley air resistance Td of the speaker casing are measured in the same manner as in the above method of air leakage test. That is, the waterproof cover or the speaker casing is fixed, in place of the electro-acoustic converter in the air leakage test, on the supplying sheet with a double face adhesive tape to measure the Gurley air resistance thereof.

Figure 2:
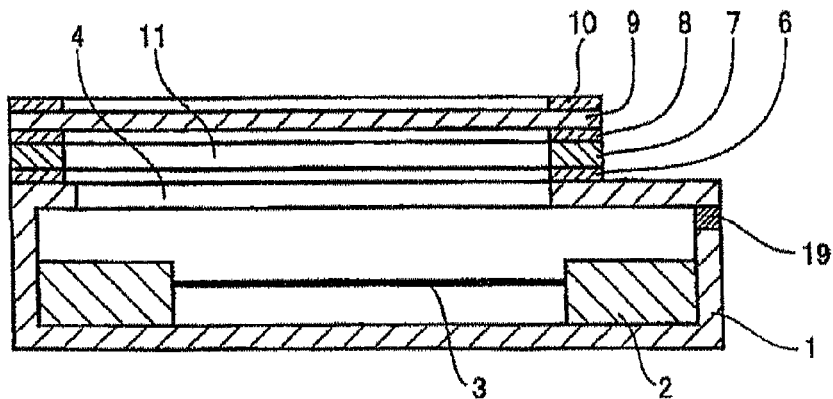
FIG. 2 is a schematic cross-sectional view of another electro-acoustic converter according to a mode for carrying out this invention.

After completion of the air leakage test, as shown in FIG. 2, the vent 5 for air leakage test may desirably be closed with sealer 19 (e.g., a screw, a rubber stopper). This is in order to prevent the acoustic characteristics of the speaker from being lowered and to prevent water from entering through the vent 5 for air leakage test. In addition, in place of a screw or the like, an adhesive tape or the like can also be attached to the casing 1 from the outside thereof.

Modified Examples of Vent for Air Leakage Test

Figure 3:
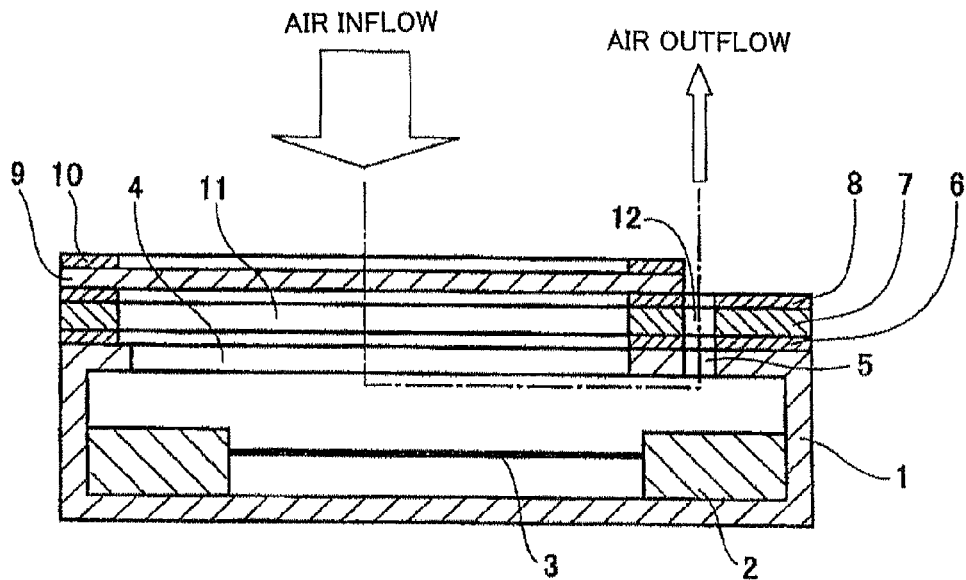
FIG. 3 is a schematic cross-sectional view of still another electro-acoustic converter according to a mode for carrying out this invention.
Figure 4:
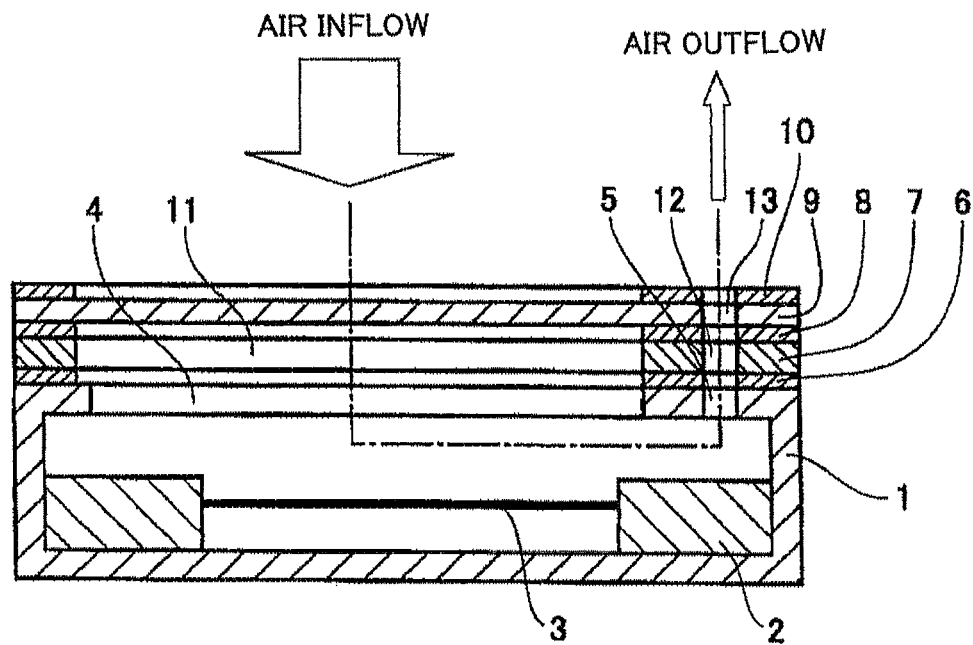
FIG. 4 is a schematic cross-sectional view of still another electro-acoustic converter according to a mode for carrying out this invention.

FIGS. 3 and 4 show cross-sections of speakers for mobile phones, which are other examples of the electro-acoustic converter. The members of the speaker shown in FIGS. 3 and 4 are basically the same as those of the speaker shown in FIG. 1. Thus, the same numerals are attached to the common members, of which explanations are omitted herein.

In the speaker shown in FIG. 1, the vent 5 for air leakage test is formed on the side face of the casing 1. In FIGS. 3 and 4, the vent 5 for air leakage test is formed on the upper face of the casing 1, like the sound hole 4. This is because the following reason: when air leakage test is carried out, it is necessary to fix the casing 1 at the bottom face or side face thereof with a fixing jig or the like (not shown), and therefore, at the bottom face or side face of the casing 1, the space for exhaust ventilation may be limited.

As a matter of course, when the vent 5 for air leakage test is provided on the upper face of the casing 1 and covered with the frame 7 (See FIG. 3) and when the vent 5 for air leakage test is covered with the waterproof film 9 (See FIG. 4), it is necessary to provide opening for air ventilations 12 and 13 on the frame 7 and the waterproof film 9 so as to be in communication with the vent 5 for air leakage test in order to release air from the inside of the casing 1 to the outside of the casing 1.

As in the speaker shown in FIG. 3, when the vent 5 for air leakage test is not covered with the waterproof film 9, even if a gasket forming an air flow outlet of a Gurley tester (not shown) to be used in the air leakage test overlaps with the vent 5 for air leakage test, the gasket and the opening for air ventilation 12 of the frame 7 are separated from each other at least at a distance corresponding to the total thickness of the waterproof film 9 and the double face tape 10, thereby ensuring an air release passage.

On the other hand, as it is described below using a drawing, in the speaker structure shown in FIG. 4, the upper face of the waterproof cover has uniform height, and therefore, when the outer casing of an electronic device is attached to the upper face side of the waterproof cover, the speaker is brought into contact with the outer casing to seal the vent 5 for air leakage test.

Figure 5:
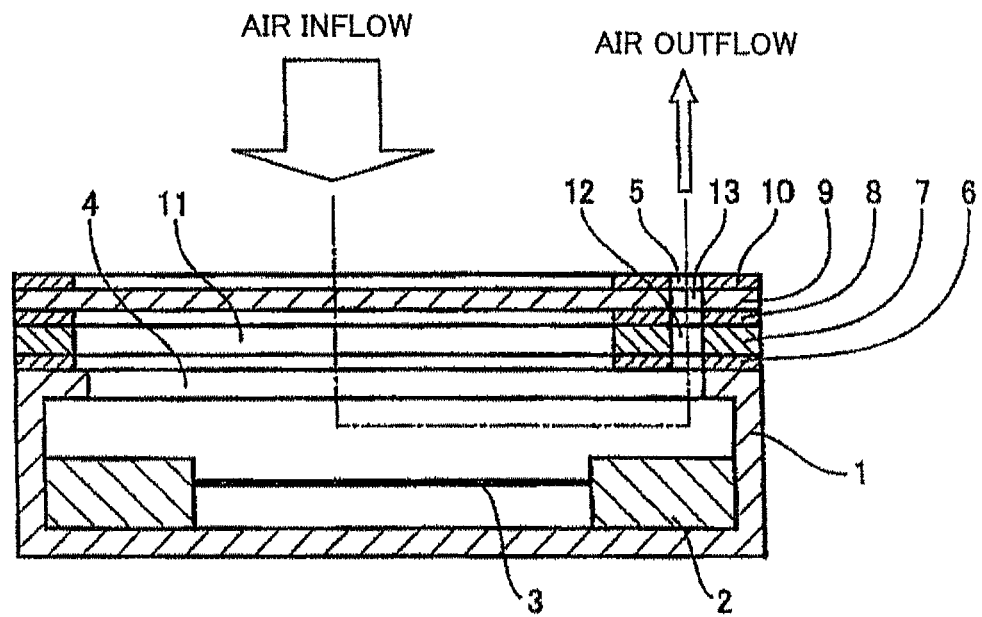
FIG. 5 is a schematic cross-sectional view of still another electro-acoustic converter according to a mode for carrying out this invention.

In addition, as shown in FIG. 5, the vent 5 for air leakage test does not necessarily have to be provided in the casing 1 but may take such a condition that the inner space of the casing 1 can be in communication with the outside. In this case, the frame 7 may desirably have high strength.

In the mode for carrying out this invention, the description was made with reference to a speaker (a sound wave generator which generates an alarm sound such as ring alert) for mobile phones, as the electro-acoustic converter; however, the same description holds true even for receivers (sound wave generators which generate talking voices of other persons) for mobile phones or speakers for digital cameras required to have waterproof property.

In addition, even not only for electro-acoustic converters which generate sound waves but also for sound wave receivers such as microphones for mobile phones, the structure is the same as the above speaker in that electric signals and vibrations of diaphragms are converted with each other, and the electro-acoustic converter of this invention can be provided.

Attachment to Outer Casing of Electric Device (First Example of Attachment)

Figure 6:
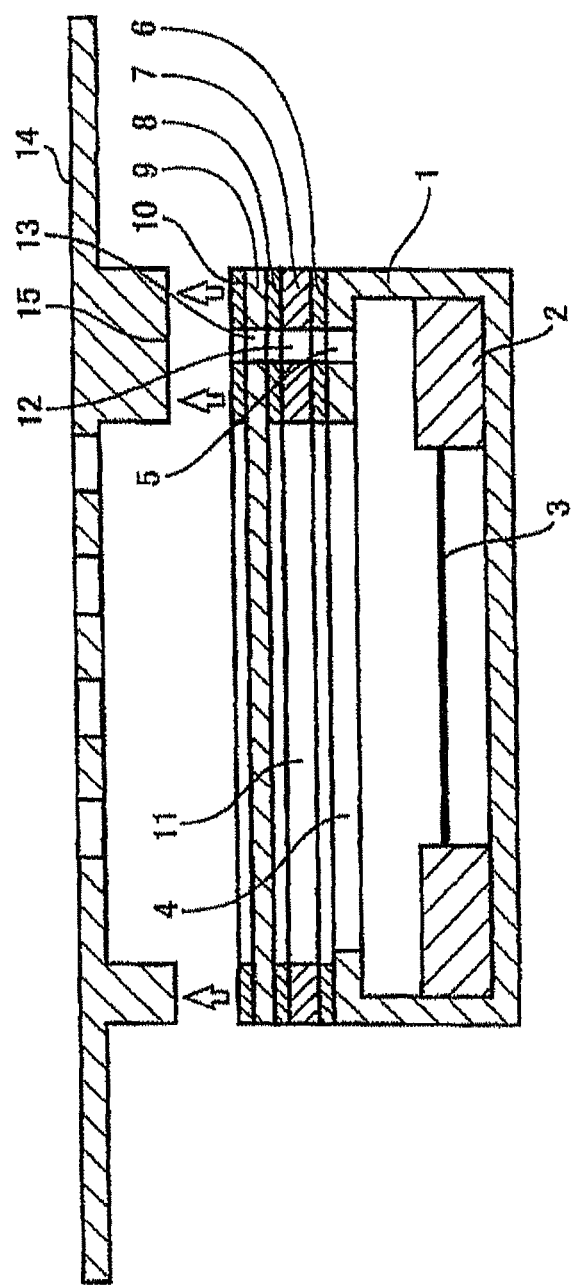
FIG. 6 is a view showing an embodiment in which an electro-acoustic converter according to a mode for carrying out this invention is attached to an outer casing.

FIG. 6 shows a situation that the speaker shown in FIG. 4 is attached to the outer casing 14 of a mobile phone. As shown in FIG. 6, the outer casing 14 is provided with a contact portion 15 having a flat face. The speaker is attached so that the opening for air ventilation 13 of the waterproof film 9 is pressed against the contact portion 15. Thus, the sealing of the vent 5 for air leakage test is completed at the same time as the attachment.

The other parts, which are necessary for the formation of a mobile phone, are assembled by any of the ordinary methods to complete the mobile phone.

(Second Example of Attachment)

Figure 7:
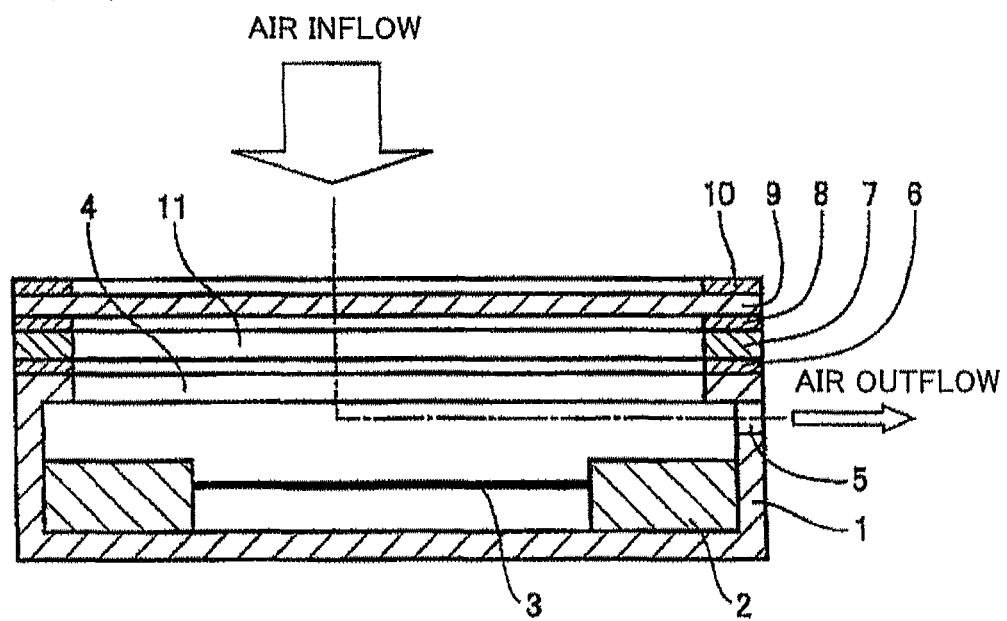
FIG. 7 is a process cross-sectional view of an electronic device according to a mode for carrying out this invention.
Figure 8:
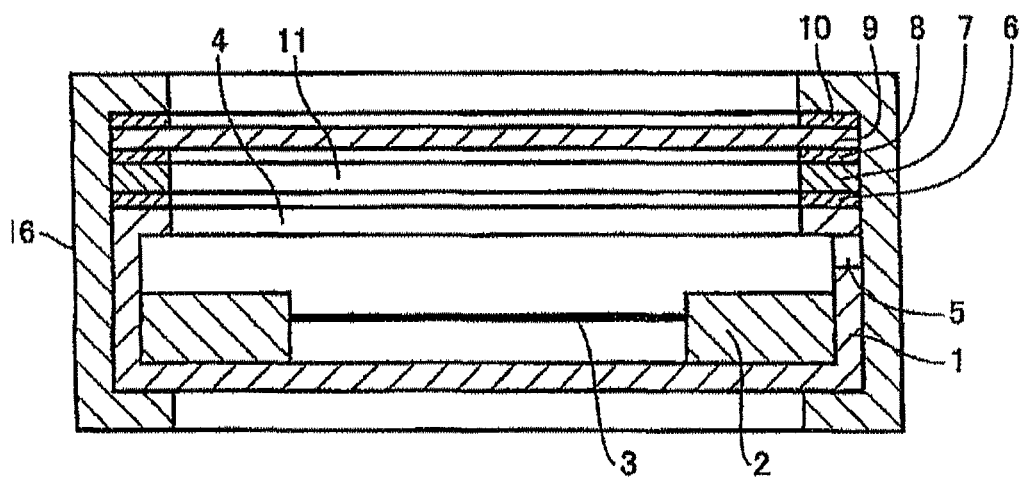
FIG. 8 is a process cross-sectional view of another electronic device according to a mode for carrying out this invention.
Figure 9:
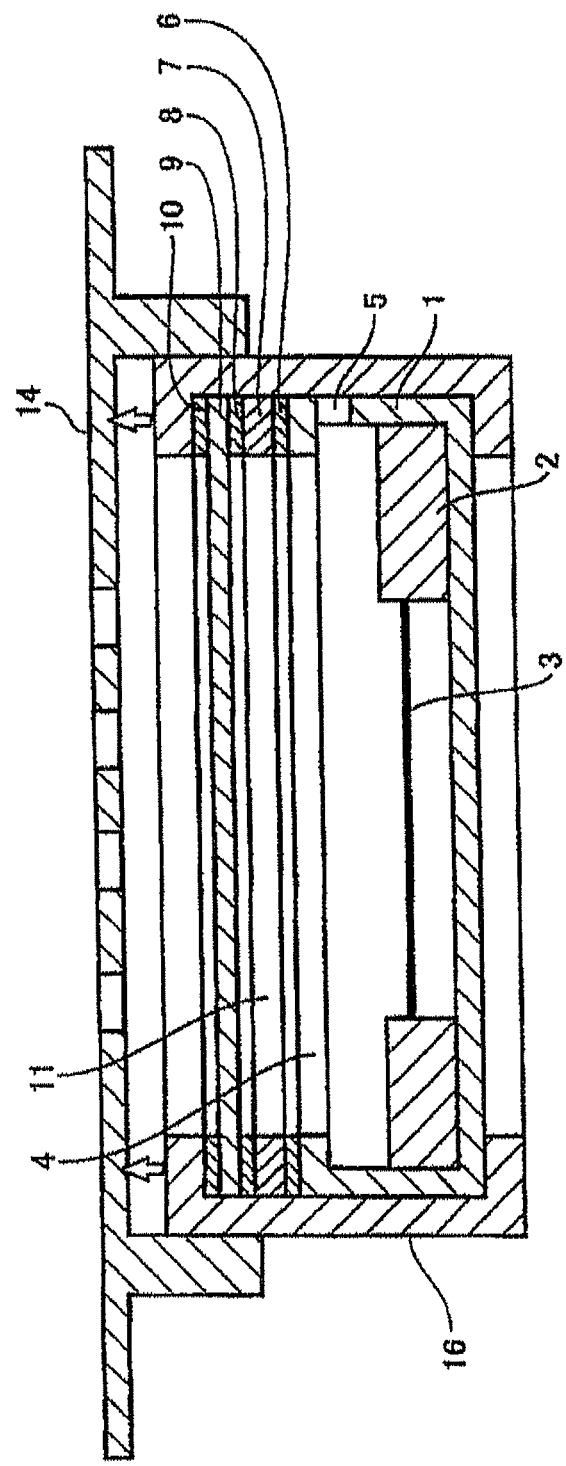
FIG. 9 is a process cross-sectional view of still another electronic device according to a mode for carrying out this invention.

FIGS. 7 to 9 are process cross-sectional views showing the steps from the air leakage test to the attachment to the outer casing. First, as shown in FIG. 7, the air leakage test of the speaker having the vent 5 which is formed on the side face of the casing 1 is carried out.

Then, as shown in FIG. 8, the periphery of the speaker is covered with rubber cover 16 as an elastic material. The vent 5 for air leakage test is sealed with the rubber cover 16.

Finally, as shown in FIG. 9, the speaker having the rubber cover 16 attached thereto is fitted into the concave portion of the outer casing 14. The rubber cover 16 can seal the vent 5 for air leakage test as described above and at the same time can allow the speaker to be firmly fitted into the concave portion of the outer casing 14.

The rubber cover 16 is effective for allowing the speaker to be fitted into the concave portion of the outer casing 14, as long as an elastic material is formed at a position where the vent for ventilation can be sealed on part of the periphery of the speaker, even if the rubber cover 16 is not formed over the entire face of the periphery of the speaker.

(Third Example of Attachment)

Figure 10:
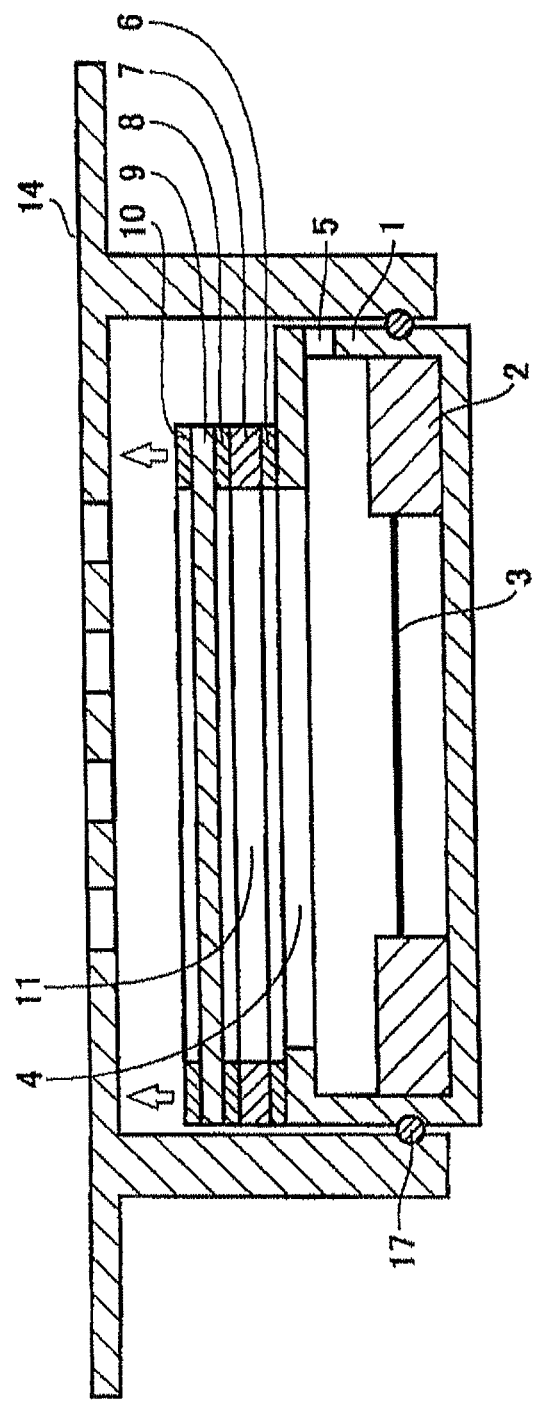
FIG. 10 is a schematic cross-sectional view of an electro-acoustic converter according to another mode for carrying out this invention.

As shown in FIG. 10, the elastic material formed on the periphery of the speaker, even if it is O-ring 17, can allow the speaker to be firmly fitted into the concave portion of the outer casing 14.

Waterproof Cover

Figure 11:
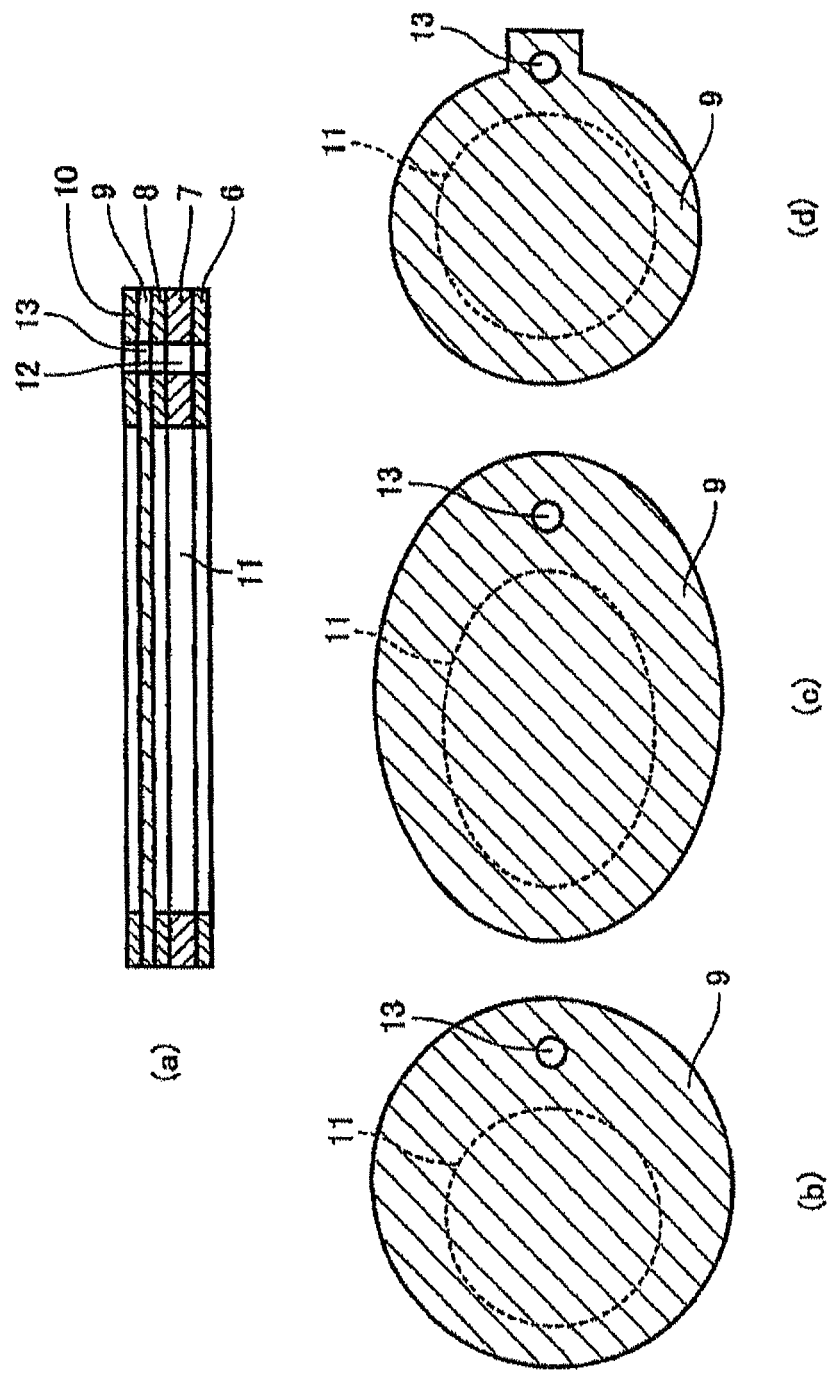
FIG. 11($a$) is a schematic cross-sectional view of a waterproof cover according to a mode for carrying out this invention, and FIGS. 11($b$) to 11($d$) are views showing variations of the shape of a waterproof film.

FIG. 11(a) is a schematic cross-sectional view of the waterproof cover which makes possible the production of the electro-acoustic converter according to the mode for carrying out this invention. As shown in FIG. 11(a), the waterproof cover according to the mode for carrying out this invention is a waterproof cover comprising frame 7 and waterproof film 9 which covers a sound opening in this frame, wherein a vent for air leakage test is formed on the frame. PORON® as described above was used for the frame 7. The porous polytetrafluoroethylene as described above was used for the waterproof film 9.

The frame 7 and the waterproof film 9 are fixed to each other with double face tape 8 (double face adhesive tape "ST-416P" available from Sumitomo 3M Limited).

FIGS. 11(b) to 11(d) show examples of plan views in which the waterproof cover shown in FIG. 11(a) is viewed from the side of the waterproof film 9. The dotted line shows the position of the periphery of the sound opening 11 in the frame 7. As shown in FIGS. 11(b) to 11(d), the frame 7 and the waterproof film 9 are provided with a wide portion for forming opening for air ventilations 12 and 13. The wide portion may be formed, as shown in FIG. 11(b), by attaching the frame 7 and the waterproof film 9 to each other while the center of the sound opening 11 on the frame 7 is deviated from the center of the waterproof film 9. Alternatively, as shown in FIG. 11(c), the waterproof film 9 may be formed in the shape of an ellipse and the wide portion may be formed at the edge in the long axis direction of this ellipse. Alternatively, as shown in FIG. 11(d), projecting edges may be formed on the waterproof film 9, the frame 7, the double face tapes 6, 8, and 10, specifically at the respective positions where the opening for air ventilations 12 and 13 are to be formed.

Figure 12:
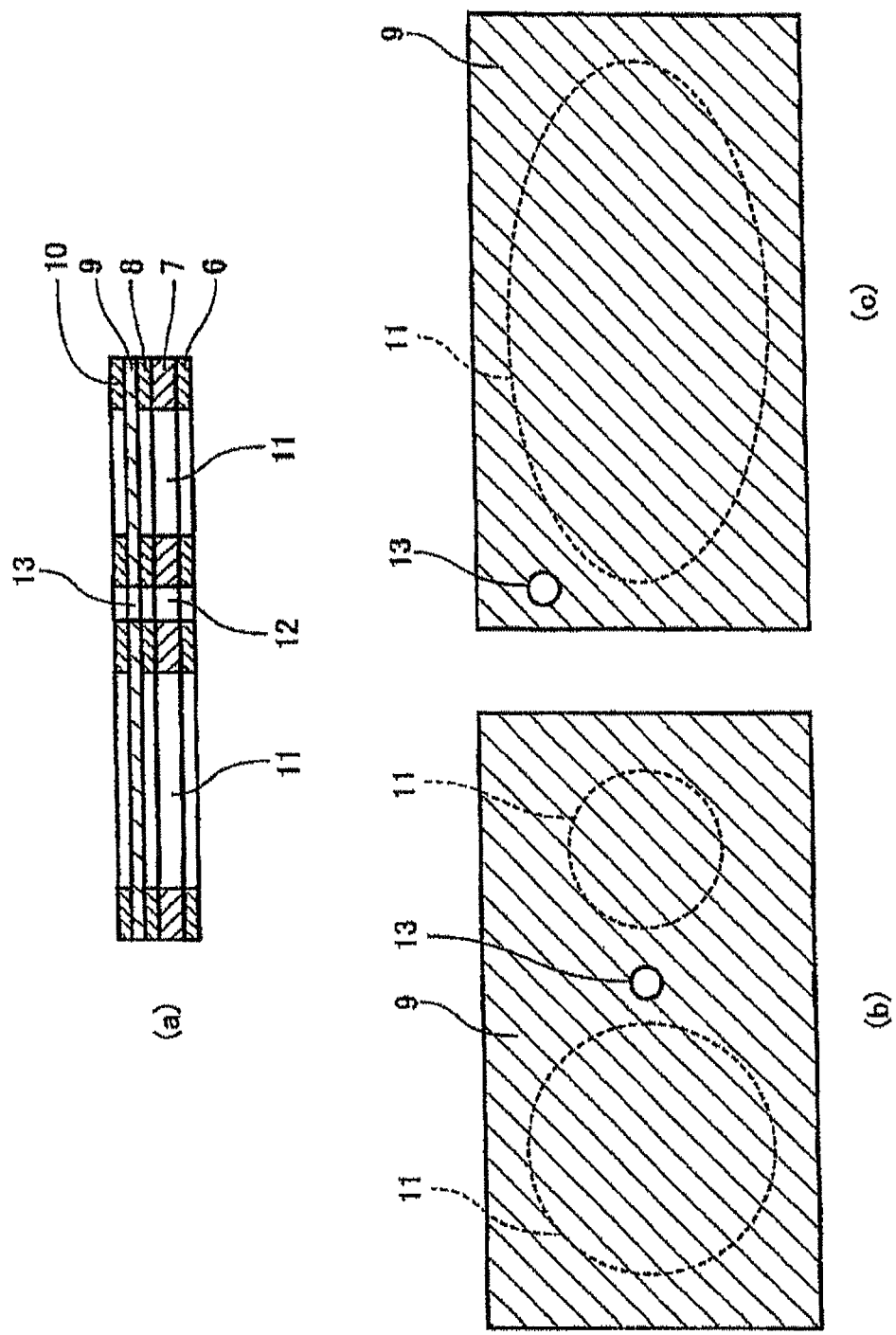
FIG. 12($a$) is a schematic cross-sectional view of another waterproof cover according to a mode for carrying out this invention, FIG. 12($b$) is a plan view thereof, and FIG. 12($c$) is a plan view of still another waterproof cover.

FIG. 12(a) is a cross-sectional view of the waterproof cover which makes possible the production of the electro-acoustic converter according to the mode for carrying out this invention. FIG. 12(a) shows an example in which two sound openings 11 are formed on the frame 7. As the two sound openings 11, there can be mentioned, for example, the sound opening 11 corresponding to the sound hole 4 (not shown in FIG. 12) of the above speaker and the sound opening 11 corresponding to the sound hole 4 (not shown) of the receiver.

FIG. 12(b) shows a plan view in which the waterproof cover shown in FIG. 12(a) is viewed form the side of the waterproof film 9. As shown in FIGS. 12(a) and 12(b), even in the case where two or more sound openings 11 are present, in case these sound openings 11 are covered with one waterproof film 9, the step of producing the waterproof cover or the step of producing the electro-acoustic converter can be simplified.

FIG. 12(c) shows an example in which the sound opening 11 corresponding to the sound hole 4 (not shown) of the speaker and the sound opening 11 corresponding to the sound hole 4 (not shown) of the receiver are combined into one sound opening 11. The waterproof film 9 is one piece of film in the same manner as in the example shown in FIG. 12(b). In this case, the sound opening 12 on the frame 7 and the opening for air ventilation 13 on the waterproof film 9 are provided in the corner of the frame 7 or in the corner of the waterproof film 9.

Example of Speaker Supply

Figure 13:
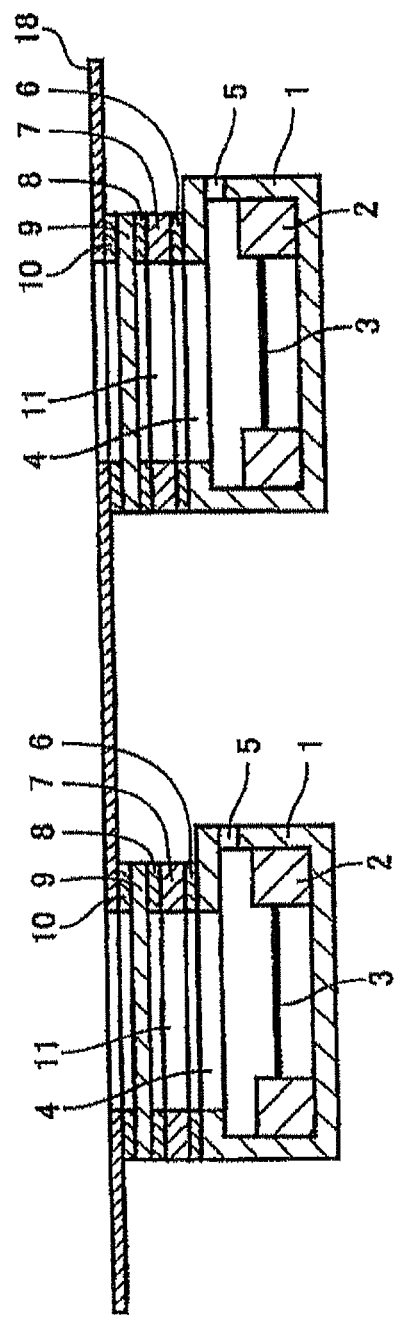
FIG. 13 is view showing an embodiment in which air leakage test is carried out for all of two or more electro-acoustic converters according to a mode for carrying out this invention.

FIG. 13 is a view showing an example of speaker supply when air leakage test is carried out for the speaker according to the mode for carrying out this invention. As shown in FIG. 13, two or more speakers each having a waterproof cover attached thereto are prepared on supplying sheet 18. This makes it possible to carry out air leakage test collectively in such a condition without removing the speakers from the supplying sheet 18. In addition, this can provide excellent handling property and can make the step of finally assembling electronic devices simplified.

In addition, when the speaker is attached to the outer casing 14 of an electronic device, it also makes possible the automatic packaging of the speaker in the electronic device by picking up the speaker from the supplying sheet 18 under the condition shown in FIG. 13. When only the waterproof film 9 is attached to an electronic device, it is necessary to attach the waterproof film 9 to the electronic device by hand working, resulting in a cause of the generation of wrinkles. Incidentally, as the procedures for placing a speaker in the outer casing 14 of an electronic device, there are a method in which the speaker is connected to a circuit board of the electronic device, followed by putting the outer casing 14 thereon, and a method in which the speaker is attached to the outer casing 14, followed by connecting the speaker to a circuit board of the electronic device.

INDUSTRIAL APPLICABILITY

This invention can be applied to electro-acoustic converters (such as microphones and speakers) of electronic devices which are required to have high water-proof property, such as mobile phones and digital cameras.

The invention claimed is:

1. An electro-acoustic converter comprising:
a casing having at least one sound hole and a vent in the casing;
a diaphragm provided in the casing;
a frame attached to the casing and having a sound opening aligned with the at least one sound hole and a frame opening aligned with the vent in the casing; and
a waterproof film disposed in the frame and covering the sound hole of the casing, wherein the waterproof film has a film opening aligned with both the frame opening and the vent in the casing.

2. The electro-acoustic converter according to claim 1, wherein the Gurley air resistance of the waterproof film is one second or higher.

3. The electro-acoustic converter according to claim 1, wherein the waterproof film is a porous polytetrafluoroethylene film.

4. The electro-acoustic converter according to claim 1, wherein the electro-acoustic converter is a sound wave receiver.

5. The electro-acoustic converter according to claim 1, wherein the electro-acoustic converter is a sound wave generator.

6. The electro-acoustic converter according to claim 1, wherein the vent for air leakage test is provided with a sealer.

7. The electro-acoustic converter according to claim 1, wherein an elastic material is formed on part or all of a periphery of the casing.

8. The electro-acoustic converter according to claim 7, wherein the vent for air leakage test is sealed with the elasticmaterial.

9. An electronic device comprising:
an outer casing having a concave portion; and
an electro-acoustic converter disposed in the concave portion of the outer casing, the electro-acoustic converter comprising:
a casing having at least one sound hole and a vent in the casing;
a diaphragm provided in the casing;
a frame attached to the casing and having a sound opening aligned with the at least one sound hole and a frame opening aligned with the vent in the casing; and
a waterproof film disposed in the frame and covering the sound hole of the casing, wherein the waterproof film has a film opening aligned with both the frame opening and the vent in the casing.

10. The electronic device of claim 9, wherein the electro-acoustic converter is in contact with part of the outer casing, so that the vent for air leakage test is sealed.

* * * * *